US012009116B2

(12) United States Patent
Wakeen et al.

(10) Patent No.: US 12,009,116 B2
(45) Date of Patent: Jun. 11, 2024

(54) NOISE REDUCTION CIRCUIT

(71) Applicants: Paul J. Wakeen, Hudson, WI (US); John Tucker, Cookeville, TN (US); Louis L. Ergmann, Jr., Bridgewater, CT (US)

(72) Inventors: Paul J. Wakeen, Hudson, WI (US); John Tucker, Cookeville, TN (US); Louis L. Ergmann, Jr., Bridgewater, CT (US)

(73) Assignee: Stillpoints LLC, Hudson, WI (US)

( * ) Notice: Subject to any disclaimer, the term of this patent is extended or adjusted under 35 U.S.C. 154(b) by 0 days.

(21) Appl. No.: 16/891,584

(22) Filed: Jun. 3, 2020

(65) Prior Publication Data

US 2021/0090765 A1 Mar. 25, 2021

Related U.S. Application Data

(60) Provisional application No. 62/856,624, filed on Jun. 3, 2019.

(51) Int. Cl.

| | |
|---|---|
| ***H01B 11/06*** | (2006.01) |
| ***H01B 11/18*** | (2006.01) |
| ***H01R 4/02*** | (2006.01) |
| ***H01R 9/05*** | (2006.01) |

(52) U.S. Cl.
CPC ........... *H01B 11/1895* (2013.01); *H01R 9/05* (2013.01)

(58) Field of Classification Search
CPC ......... H01B 11/06; H01R 4/021; H01R 4/023
USPC ....................................................... 174/36, 27
See application file for complete search history.

(56) References Cited

U.S. PATENT DOCUMENTS

| | | | | |
|---|---|---|---|---|
| 4,383,225 A * | 5/1983 | Mayer | H01B 11/146 | 333/243 |
| 5,030,614 A * | 7/1991 | Hollander | G01R 33/1246 | 505/161 |
| 5,033,091 A * | 7/1991 | Bond | H01B 11/125 | 174/105 R |
| 5,171,938 A * | 12/1992 | Katsumata | H01B 11/1091 | 174/117 FF |
| 5,201,223 A * | 4/1993 | McQueen | G01F 1/002 | 73/304 R |
| 5,262,592 A * | 11/1993 | Aldissi | H01B 11/146 | 174/106 SC |
| 5,399,295 A * | 3/1995 | Gamble | H01B 1/24 | 428/300.1 |
| 6,064,000 A * | 5/2000 | Kim | H01R 4/726 | 138/138 |
| 6,906,261 B2 * | 6/2005 | Kondoh | B60R 16/0207 | 174/72 A |
| 9,947,440 B2 * | 4/2018 | Sekido | H01B 7/0216 | |
| 10,490,103 B1 * | 11/2019 | Bauer | H02G 3/123 | |
| 2019/0312419 A1 * | 10/2019 | Kawashita | H02G 3/0481 | |
| 2019/0357313 A1 * | 11/2019 | Lim | H05B 1/0275 | |

FOREIGN PATENT DOCUMENTS

KR 20-2010-0006196 * 6/2010

* cited by examiner

*Primary Examiner* — Chau N Nguyen
(74) *Attorney, Agent, or Firm* — Laabs Intellectual Property

(57) ABSTRACT

In some embodiments, a noise reduction circuit comprises an insulated wire comprising a conductor and insulation. A shielding material is oriented around the insulated wire. The shielding material comprises metallized fibers.

19 Claims, 8 Drawing Sheets

NOISE REDUCTION CIRCUIT

CROSS-REFERENCE TO RELATED APPLICATIONS

This application claims the benefit of U.S. Patent Application No. 62/856,624, filed Jun. 3, 2019, the entire content of which is hereby incorporated herein by reference.

BACKGROUND OF THE INVENTION

This invention relates to electrical circuits and electronic components having electrical circuits, as well as cabling and wiring for electronic components.

Electronic components are generally known in the art and are used for various functions. Computers, video displays, video components, audio components, phones, tablets and many other products can be considered electronic components. Electronic components generally include electrical circuits. Electrical circuits can also include power cords, interconnecting cords (e.g. audio and/or video cables, HDMI, etc.), adapters, etc.

Electronic components can be susceptible to noise, such as electromagnetic interference, radio-frequency interference, etc. Conductors in and around electronic components can act as antennas that receive (and broadcast) undesired signals that contaminate an original data signal, resulting in undesired sounds, images and errors.

There remains a need for novel devices and methods for reducing electronic noise and interference.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a noise reduction circuit comprises a conductive wire comprising a conducive attachment location. An insulator surrounds the wire and a shielding material is oriented around the insulator. The shielding material comprises metallized fibers.

In some embodiments, a noise reduction circuit comprises an insulated wire comprising a conductor and insulation. A shielding material is oriented around the insulated wire. The shielding material comprises metallized fibers.

In some embodiments, the metallized fibers of the shielding material are arranged in a random pattern. In some embodiments, the shielding material comprises an insulating carrier material.

In some embodiments, a noise reduction circuit further comprises a filter arranged to surround the conductive wire. In some embodiments, the filter comprises a ring of magnetic material.

In some embodiments, the conductive wire and insulator are arranged in a loop. In some embodiments, first and second ends of the conductive wire are attached to one another. In some embodiments, the loop comprising a first elongate portion and a second elongate portion extending adjacent to one another.

In some embodiments, a cord comprises a first terminal plug and a second terminal plug. In some embodiments, the first terminal plug comprises a male plug and the second terminal plug comprises a female plug. In some embodiments, a first conductor extends from the first terminal plug to the second terminal plug. In some embodiments, a second conductor extends from the first terminal plug to the second terminal plug. In some embodiments, a noise reduction circuit comprises a wire, an insulator surrounding the wire and a shielding material oriented around the insulator. In some embodiments, the shielding material comprising metallized fibers. In some embodiments, the wire is in electrical communication with the first conductor. In some embodiments, a cord comprises a first noise reduction circuit in electrical communication with the first conductor and a second noise reduction circuit in electrical communication with the second conductor.

In some embodiments, the first noise reduction circuit extends parallel to the second noise reduction circuit. In some embodiments, a spacer is arranged to position the first noise reduction circuit with respect to the second noise reduction circuit These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
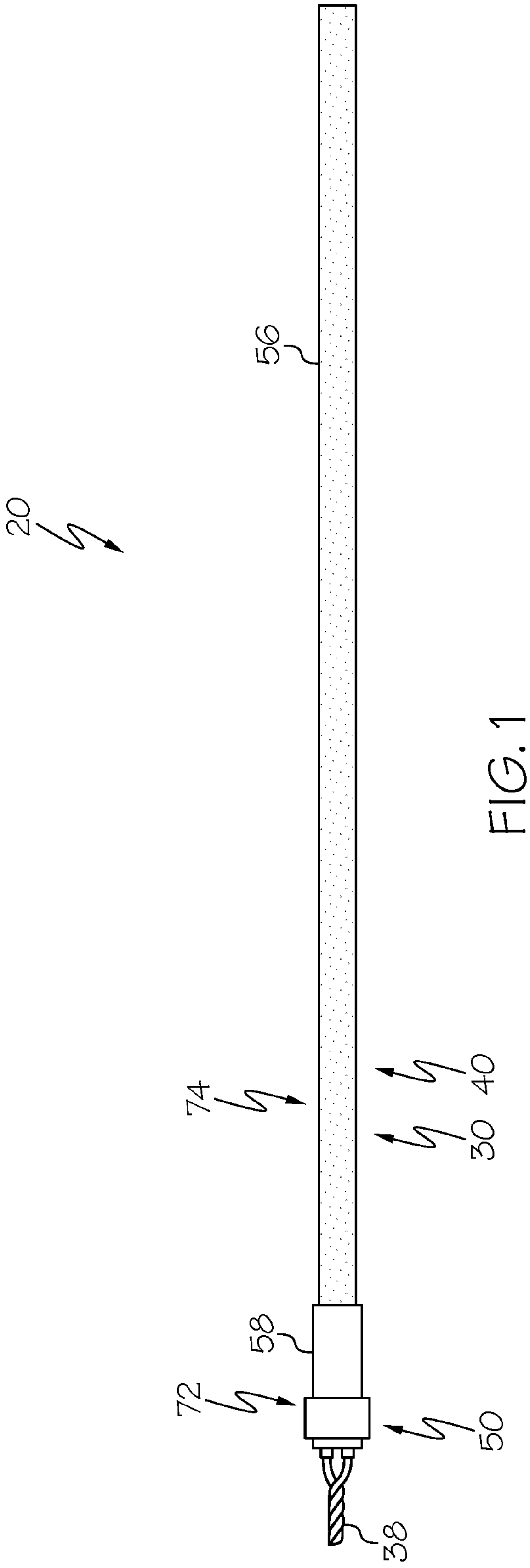
FIG. 1 shows an embodiment of a noise reduction circuit.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
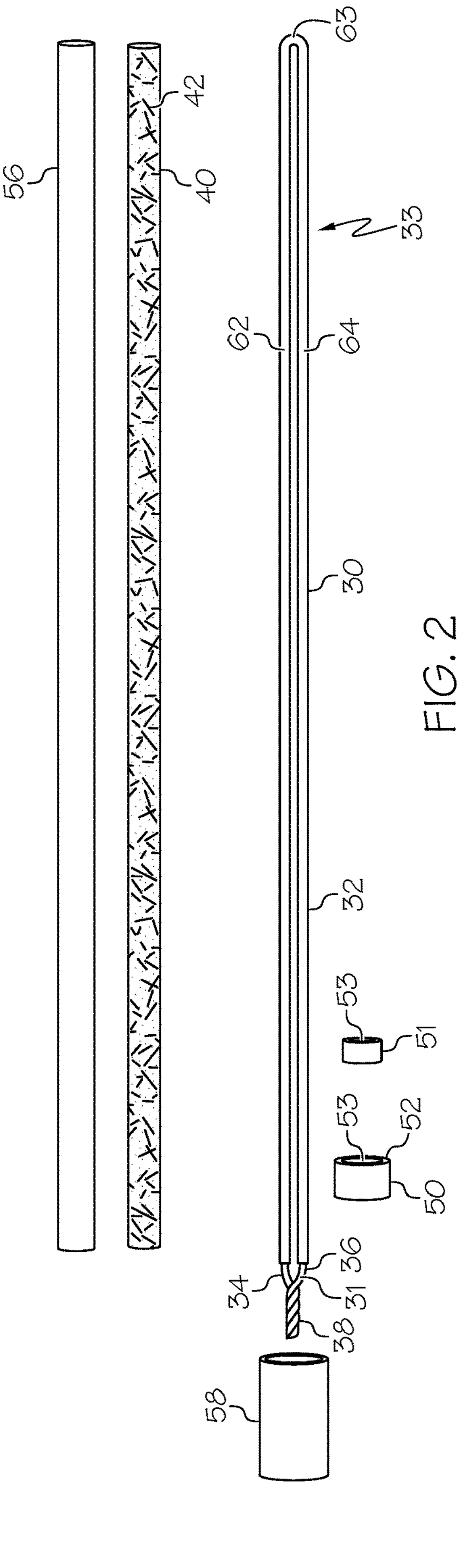
FIG. 2 shows an exploded view of an embodiment of a noise reduction circuit.
Figure 3:
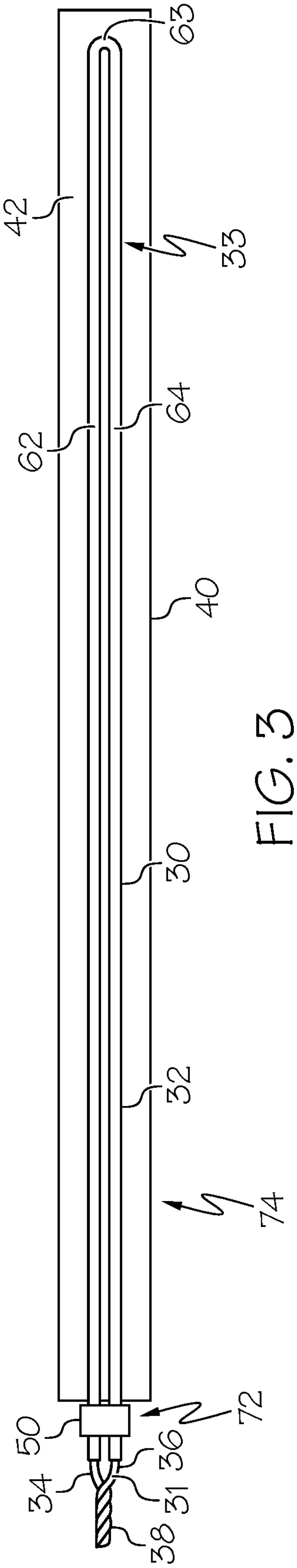
FIG. 3 shows an embodiment of a noise reduction circuit during assembly.

FIG. 1 shows an embodiment of a noise reduction circuit 20 that is suitable for use with electronic components and devices. FIG. 2 shows an exploded view of an embodiment of a noise reduction circuit 20. FIG. 3 shows an embodiment of a noise reduction circuit 20 during assembly.

Referring to FIGS. 1-3, in some embodiments, a noise reduction circuit 20 comprises a wire 30 and a shielding material 40. In some embodiments, a noise reduction circuit 20 further comprises a protector 56, such as a sleeve, for example to protect and/or electrically insulate the noise reduction circuit 20. In some embodiments, a noise reduction circuit 20 further comprises a choke 50.

In some embodiments, the noise reduction circuit 20 comprises a conductive attachment location 38, for example for electrically connecting the noise reduction circuit 20 to a conductor of an electronic component or device. Desirably, the wire 30 comprises a conductor 31. The conductor 31 can comprise any suitable electrically conductive material, such as a metal. Different materials used as the conductor 31 can produce different results, for example different amounts of noise reduction, different frequencies of noise reduction, etc. In some embodiments, a conductor 31 comprises aluminum, copper, silver, nickel or various combinations thereof, or alloys of any of these materials with one or more other materials. The conductor 31 can have any suitable size (e.g. diameter) and length. In some embodiments, the wire 30 comprises 15 gauge stranded high purity copper insulated wire.

Desirably, the wire 30 comprises an insulating material 32 surrounding the conductor 31 to electrically insulate the conductor 31 along at least a portion of its length. In some embodiments, the wire 30 comprises an insulting material 32 along its entire length except for one or more end portions 34, 36.

In some embodiments, shielding material 40 is placed around the wire 30. In some embodiments, shielding material 40 comprises a material arranged to reduce electromagnetic interference (EMI) and/or radio-frequency interference (RFI). In some embodiments, shielding material 40 comprises a material arranged to attenuate, redirect, absorb and/or diffuse EMI/RFI signals. In some embodiments, shielding material 40 comprises conductive fibers 42. In some embodiments, conductive fibers 42 are arranged in a non-woven pattern. In some embodiments, conductive fibers 42 are arranged in a random pattern. In some embodiments, shielding material 40 comprises a conductive sheet comprising conductive fibers 42 and a binder lamination. In some embodiments, a binder lamination comprises polyester. In some embodiments, the binder lamination is non-conductive. In some embodiments, the conductive fibers 42 comprise metallized fibers, for example comprising any suitable fiber material coated with any suitable conductor. In some embodiments, conductive fibers 42 comprise natural fibers, man-made fibers, carbon fibers, graphite fibers glass fibers, aramid fibers, texmet fibers, etc. In some embodiments, the conductive fibers 42 comprise a coating comprising nickel, copper, aluminum, silver, gold, etc. In some embodiments, shielding material 40 comprises different combinations of conductive fibers 42 as disclosed herein. In some embodiments, shielding material 40 comprises ERS material (e.g. fabric sheets) available from Stillpoints, LLC, 573 County Road A, Suite 103, Hudson, WI 54016.

In some embodiments, the wire 30 is arranged in a loop 33. In some embodiments, a first end 34 of the wire 30 is attached to a second end 36 of the wire 30. In some embodiments, a first end 34 of the conductor 31 is attached to a second end 36 of the conductor 31. In some embodiments, the first and second ends 34, 36 are twisted. In some embodiments, the first and second ends 34, 36 are soldered together. In some embodiments, the ends 34, 36 comprise a conductive attachment location 38 for the noise reduction circuit 20 to be electrically attached to a conductor of an electronic component or device.

In some embodiments, the wire 30 is substantially folded in half. In some embodiments, the wire 30 comprises a first portion 62, a bend 63 and a second portion 64. In some embodiments, the first portion 62 and second portion 64 each comprise elongate lengths of wire 30. In some embodiments, the first portion 62 and second portion 64 extend substantially parallel to one another. In some embodiments, the first portion 62 and second portion 64 twist helically along a length of the loop 33. In some embodiments, shielding material 40 is wrapped around the wire 30. In some embodiments, shielding material 40 is wrapped around a loop 33 of wire 30, such that the shielding material 40 collectively surrounds a first portion 62 and a second portion 64 of the wire 30. In some embodiments, shielding material 40 is wrapped around a first portion 62, a bend 63 and a second portion 64 of the wire 30.

In some embodiments, an adhesive is used to secure the shielding material 40 to the wire 30. In some embodiments, the shielding material 40 comprises ERS material with pressure sensitive adhesive available from Stillpoints, LLC.

The noise reduction circuit 20 can have any suitable length. The wire 30 can have any suitable length. In some embodiments, the noise reduction circuit 20 has a length of approximately 6 inches or more, wherein each portion 62, 64 of a wire loop 33 has a length of 6 inches or more. In some embodiments, the noise reduction circuit 20 has a length of approximately 12 inches or more. Embodiments of a noise reduction circuit 20 having a length of 14 inches or more are believed to be more effective than shorter length embodiments, although various embodiments can be more or less effective than other embodiments due to the range of EMI/RFI and the specific requirements of a given electronic device.

In some embodiments, the noise reduction circuit 20 comprises an electronic choke or filter 50. In some embodiments, a filter 50 comprises a passive EMI filter such as a ferrite bead. In some embodiments, a filter 50 comprises a ring 52 of magnetic material. In some embodiments, a filter 50 comprises a ring 52 of glass material. In some embodiments, a filter 50 comprises a nanocrystalline soft magnetic material, for example a FINEMET® Bead available from Hitachi Metals America, LLC, 85 W. Algonquin Road, Suite 499 Arlington Heights, IL 60005.

In some embodiments, the filter 50 comprises an aperture 53 and the wire 30 passes through the aperture 53. In some embodiments, the loop 33 extends through the aperture 53, for example, in some embodiments, the first portion 62 and the second portion 64 extend through the aperture 53.

In some embodiments, a noise reduction circuit 20 comprises a second filter 51. In some embodiments, the second filter 51 comprises an aperture 53 and the wire 30 passes through the aperture 53. In some embodiments, the loop 33 extends through the aperture 53.

In some embodiments, the second filter 51 is different from the first filter 50. In some embodiments, the second filter 51 comprises a different material from the first filter 50. In some embodiments, the second filter 51 comprises a different size or shape from the first filter 50. In some embodiments, the first filter 50 and second filter 51 each provide filtering for different frequency ranges.

In some embodiments, the second filter 51 is directly adjacent to the first filter 50. In some embodiments, the second filter 51 is spaced apart from the first filter 50.

In some embodiments, the shielding material 40 extends through the filter(s) 50. 51, for example being wrapped around the wire 30 and extending through the aperture 53.

In some embodiments, the noise reduction circuit 20 comprises a filter 50 and shielding material 40, but the filter 50 does not overlap the shielding material 40. In some embodiments, the wire 30 comprises a first length portion 72 that is surrounded by the filter 50 but not surrounded by shielding material 40. In some embodiments, the wire 30 comprises a second length portion 74 that is surrounded by the shielding material 40 but not surrounded by the filter 50. In some embodiments, the loop 33 comprises a first length portion 72 that is surrounded by the filter 50 but not surrounded by shielding material 40. In some embodiments, the loop 33 comprises a second length portion 74 that is surrounded by the shielding material 40 but not surrounded by the filter 50.

In some embodiments, the noise reduction circuit 20 comprises a protector 56 positioned over the shielding material 40, which can both electrically insulate the shielding material 40 and physically protect the noise reduction circuit 20. A protector 56 can comprise any suitable material and have any suitable arrangement. In some embodiments, a protector 56 comprises a sleeve of material arranged to surround the shielding material 40. In some embodiments, a protector 56 comprises a cable sleeve, for example being an expandable or non-expandable braided sleeving material.

In some embodiments, a heat shrink material 58 is positioned over a portion of the protector 56 and secured to the noise reduction circuit 20. In some embodiments, the heat shrink material 58 is used to secure the protector 56. In some embodiments, the heat shrink material 58 is further positioned over the first filter 50 and used to secure the first filter 50. In some embodiments, the heat shrink material 58 is further positioned over the second filter 51.

In some embodiments, a conductive attachment location 38 extends from one end of the noise reduction circuit 20 and is used to attach the device to an electrical device, component or circuit. In some embodiments, the conductive attachment location 38 is attached to a hotwire power connection of an AC power circuit. In some embodiments, the conductive attachment location 38 is attached to a ground connection. In some embodiments, the conductive attachment location 38 is attached to a neutral power connection of an AC power circuit. In some embodiments, the noise reduction circuit 20 is incorporated into a power cord. In some embodiments, the noise reduction circuit 20 is incorporated into an electronic device, for example being positioned within the chassis.

In some embodiments, a noise reduction circuit 20 comprises a plurality of conductive attachment locations 38. In some embodiments, each conductive attachment location 38 is electrically attached to a separate grounding location of an electronic component or device. In some embodiments, a filter 50 is placed adjacent to each conductive attachment location 38. In some embodiments, the noise reduction circuit 20 comprises separate first and second conductive attachment locations 38, for example having one conductive attachment location 38 at each end of a wire 30 (e.g. a wire 20 that is not looped), and further comprises a first filter 50 adjacent to the first conductive attachment location 38 and a second filter 50 adjacent to the second conductive attachment location 38.

In some embodiments, a noise reduction circuit 20 further comprises a crystalline and/or mineral material incorporated into the circuit itself or arranged to surround the circuit.

Figure 4:
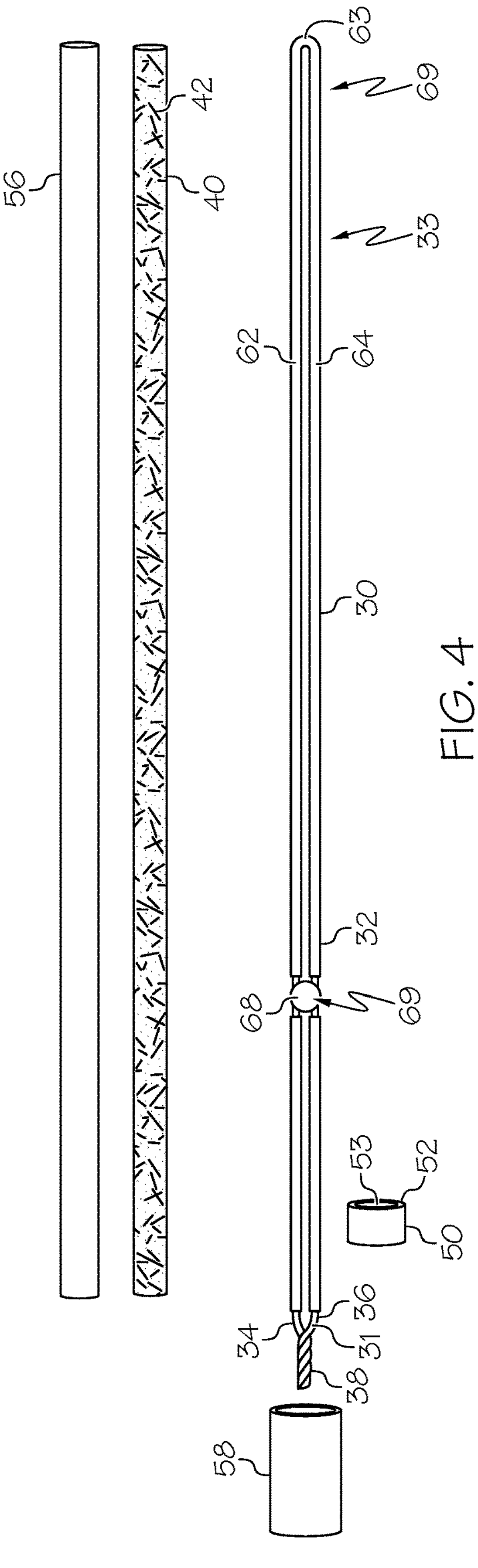
FIG. 4 shows an exploded view of another embodiment of a noise reduction circuit.

FIG. 4 shows another embodiment of a noise reduction circuit 20. In some embodiments, a component 68 comprising crystalline and/or mineral material 69 is placed in contact with the conductor 31 of a wire 30. In some embodiments, the insulation 32 of the wire 30 is stripped and the component 68 is attached directly to the conductor 31. In some embodiments, the wire 30 extends in a loop 33 and comprises a first portion 62 and a second portion 64, and the component is conductively attached to the conductor 31 of the first portion 62 and to the conductor 31 of the second portion 64. In some embodiments, a crystalline and/or mineral material 69 comprises infra-red powder and/or negative ion powder is placed in a conductive arrangement with the conductor 31. In some embodiments, such the component 68 comprising crystalline and/or mineral material 69 is available as a sticker, such as Quantum Stickers or Graphene Stickers available from Telos Audio Design, No. 102, Pingding Rd., Tamsui Dist., New Taipei City 251, Taiwan (R.O.C).

In some embodiments, a crystalline and/or mineral material 69 can be embedded into the insulation 32 that surrounds the wire 30.

Figure 5:
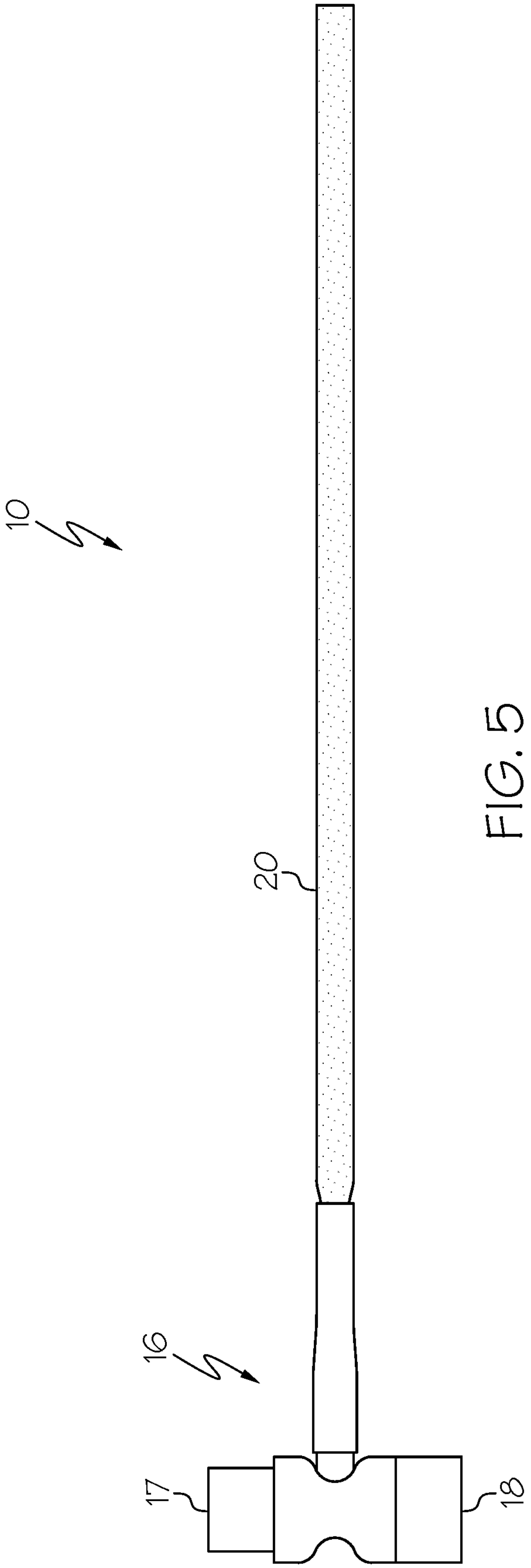
FIG. 5 shows an embodiment of an electronic component.

FIG. 5 shows an embodiment of an electronic component 10 comprising an embodiment of a noise reduction circuit 20. As shown, the electronic component 10 comprises a power cord adapter 16.

Figure 6:
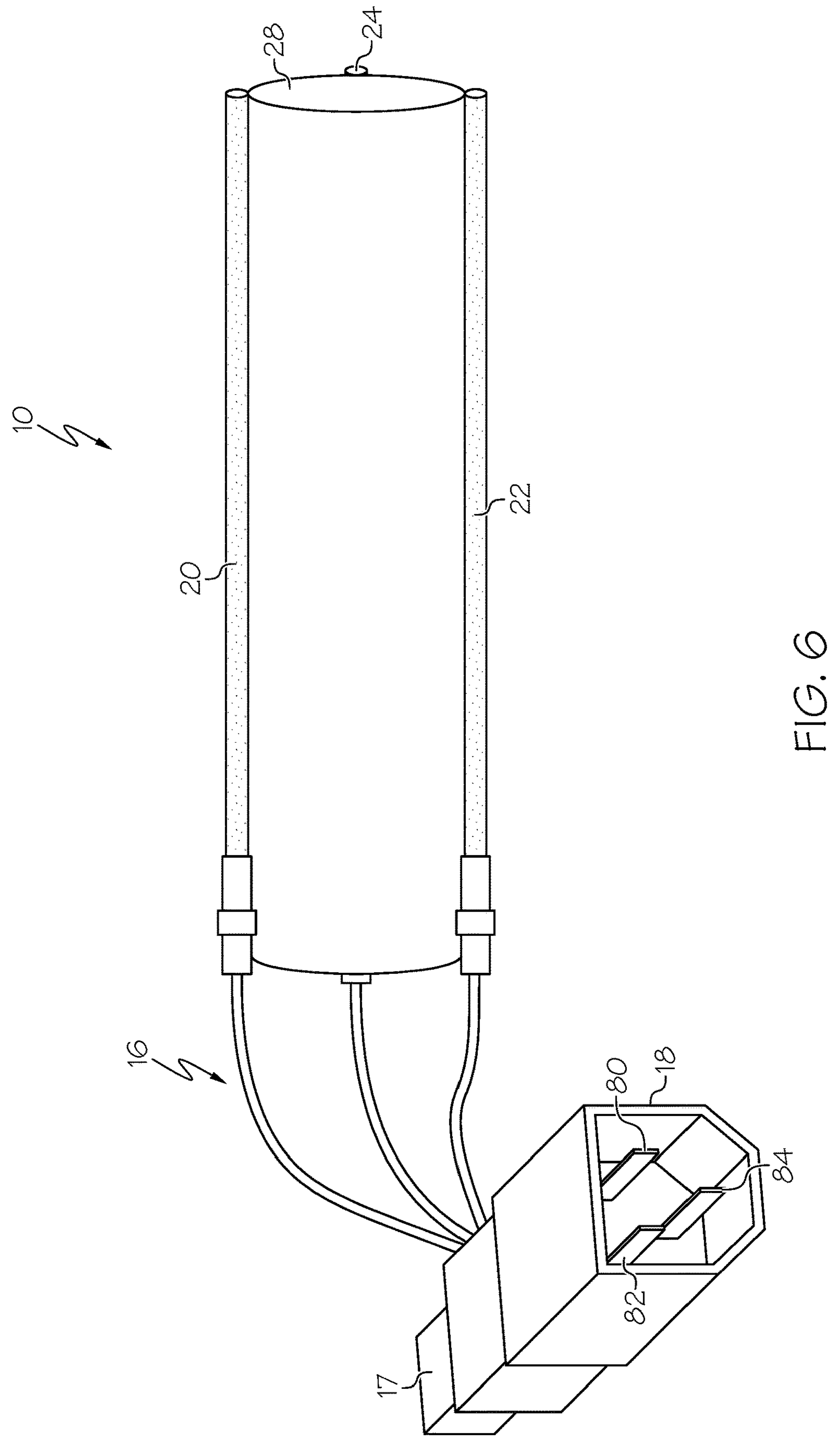
FIG. 6 shows another embodiment of an electronic component.

FIG. 6 shows an electronic component 10 that comprises multiple noise reduction circuits 20, 22, 24.

In some embodiments, a power cord adapter 16 comprises a first portion 17 arranged to engage an electronic device and a second portion 18 arranged to receive a power cord. In some embodiments, a power cord adapter 16 comprises IEC couplers. In some embodiments, the first portion 17 comprises an IEC connector, such as a C13 connector. In some embodiments, the second portion comprises an IEC inlet, such as a C14 inlet. Thus, in some embodiments, the power cord adapter 16 can be inserted between an electronic device having a C14 inlet and a power cable having a C13 connector.

In some embodiments, an electronic component 10 comprises a first conductor 80 and a second conductor 82. In some embodiments, the first conductor 80 comprises a first power conductor such as hotwire. In some embodiments, the second conductor 82 comprises a second power conductor such as a neutral. In some embodiments, a power cord adapter 16 further comprises a third conductor 84. In some embodiments, a third conductor 84 comprises a ground conductor.

In various embodiments, a noise reduction circuit 20 can be provided for any of the conductors 80, 82, 84.

In some embodiments, a noise reduction circuit 20 is electrically connected to the first conductor 80 and insulated from the second conductor 82 and the third conductor 84.

In some embodiments, a noise reduction circuit 20 is electrically connected to the second conductor 82 and insulated from the first conductor 80 and the third conductor 84.

In some embodiments, a noise reduction circuit 20 is electrically connected to the third conductor 84 and insulated from the first conductor 80 and the second conductor 82.

In some embodiments, an electronic component 10 comprises a first noise reduction circuit 20 electrically connected to the first conductor 80 and a second noise reduction circuit 22 electrically connected to the second conductor 82.

In some embodiments, an electronic component 10 comprises a first noise reduction circuit 20 electrically connected to the first conductor 80 and a second noise reduction circuit 22 electrically connected to the third conductor 84.

In some embodiments, an electronic component 10 comprises a first noise reduction circuit 20 electrically connected to the second conductor 82 and a second noise reduction circuit 22 electrically connected to the third conductor 84.

In some embodiments, an electronic component 10 comprises a first noise reduction circuit 20 electrically connected to the first conductor 80, a second noise reduction circuit 22 electrically connected to the second conductor 82 and a third noise reduction circuit 24 electrically connected to the third conductor 84.

In some embodiments, an electronic component 10 comprises a spacer 28 that positions one or more noise reduction circuits 20, 22, 24. In some embodiments, a noise reduction circuit 20 is attached to the spacer 28, for example using an adhesive. In some embodiments, a second noise reduction circuit 22 is attached to the spacer 28. In some embodiments, the spacer 28 separates the first noise reduction circuit 20 from the second noise reduction circuit 22. In some embodiments, the first noise reduction circuit 20 is oriented parallel to the second noise reduction circuit 22. In some embodiments, the size of a gap between the first noise reduction circuit 20 and the second noise reduction circuit 22 is greater than a width dimension of a noise reduction circuit 20. In some embodiments, the size of a gap between the first noise reduction circuit 20 and the second noise reduction circuit 22 is greater than a diameter of a filter 50. In some embodiments, a third noise reduction circuit 24 is attached to the spacer 28. In some embodiments, the third noise reduction circuit 24 extends parallel to the first noise reduction circuit 20. In some embodiments, multiple noise reduction circuits 20, 22, 24 are equally spaced from one another. In some embodiments, multiple noise reduction circuits 20, 22, 24 are equally spaced about a perimeter of the spacer 28.

Figure 7:
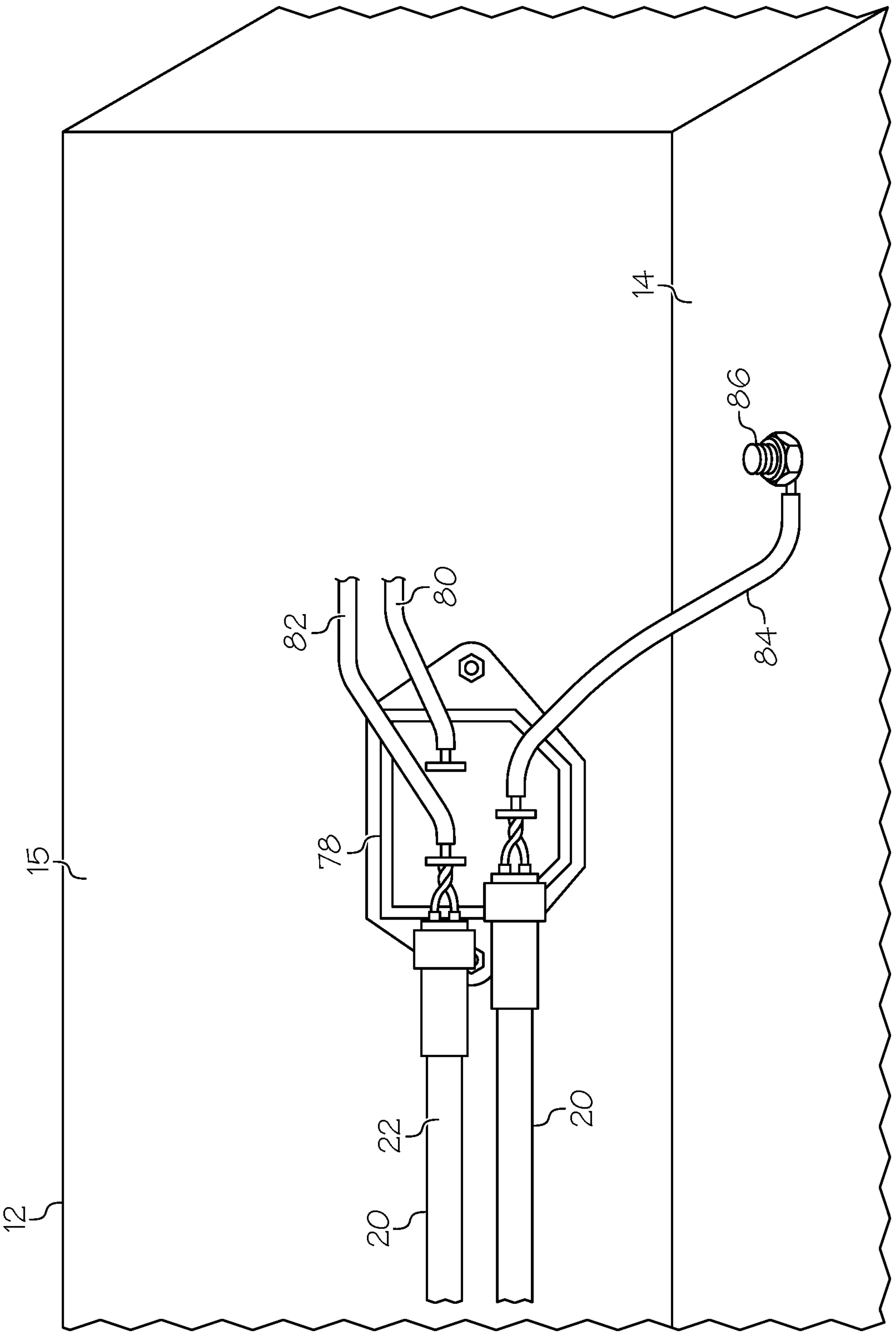
FIG. 7 shows an embodiment of an electronic device.

FIG. 7 shows an embodiment of an electronic device 12 comprising an embodiment of a noise reduction circuit 20. An electronic device 12 can comprise any suitable type of electronic device, including but not limited to audio equipment, video equipment, processors, amplifiers, source components, displays, imaging machines, etc. In some embodiments, an electronic device 12 comprises a chassis 14 and a noise reduction circuit 20 is located within the chassis 14. FIG. 7 shows a power connection 78 extending through a sidewall 15 of the chassis 14. In some embodiments, a power connection 78 comprises an IEC connector. In some embodiments, the power connection 78 comprises connections for a hotwire 80, a neutral wire 82 and a ground wire 84. In some embodiments, the hotwire 80 and the neutral wire 82 connect to other components of the electronic device 12 located within the chassis 14. In some embodiments, the ground wire 84 connects to a chassis ground 86.

In some embodiments, an electronic device 12 can comprise any suitable number of noise reduction circuits 20, with each noise reduction circuit 20 in electrical communication with a conductor 80, 82, 84.

In some embodiments, an electronic device 12 comprises a noise reduction circuit 20 that is electrically attached to a ground connection of the electronic device 12. The noise reduction circuit 20 can attach to any suitable ground location, for example at a terminal of a power connection 78, along a length of a ground wire 84, at a chassis ground 86 connection, or any other suitable portion of the electronic device 12 that comprises a ground.

In some embodiments, an electronic device 12 comprises a noise reduction circuit 20 that is electrically attached to a neutral power conductor of the electronic device 12. The noise reduction circuit 20 can attach to any suitable neutral power conductor location, for example at a terminal of a power connection 78, along a length of a neutral wire 82, or any other suitable portion of the electronic device 12 that comprises a neutral power conductor.

In some embodiments, an electronic device 12 comprises a first noise reduction circuit 20 electrically attached to ground (e.g. 84) and a second noise reduction circuit 22 electrically attached a neutral power conductor (e.g. 82). In some embodiments, a third noise reduction circuit 24 is electrically attached to a hotwire 80.

In some embodiments, the noise reduction circuit 20 further comprises a particulate material surrounding the components disclosed herein.

Figure 8:
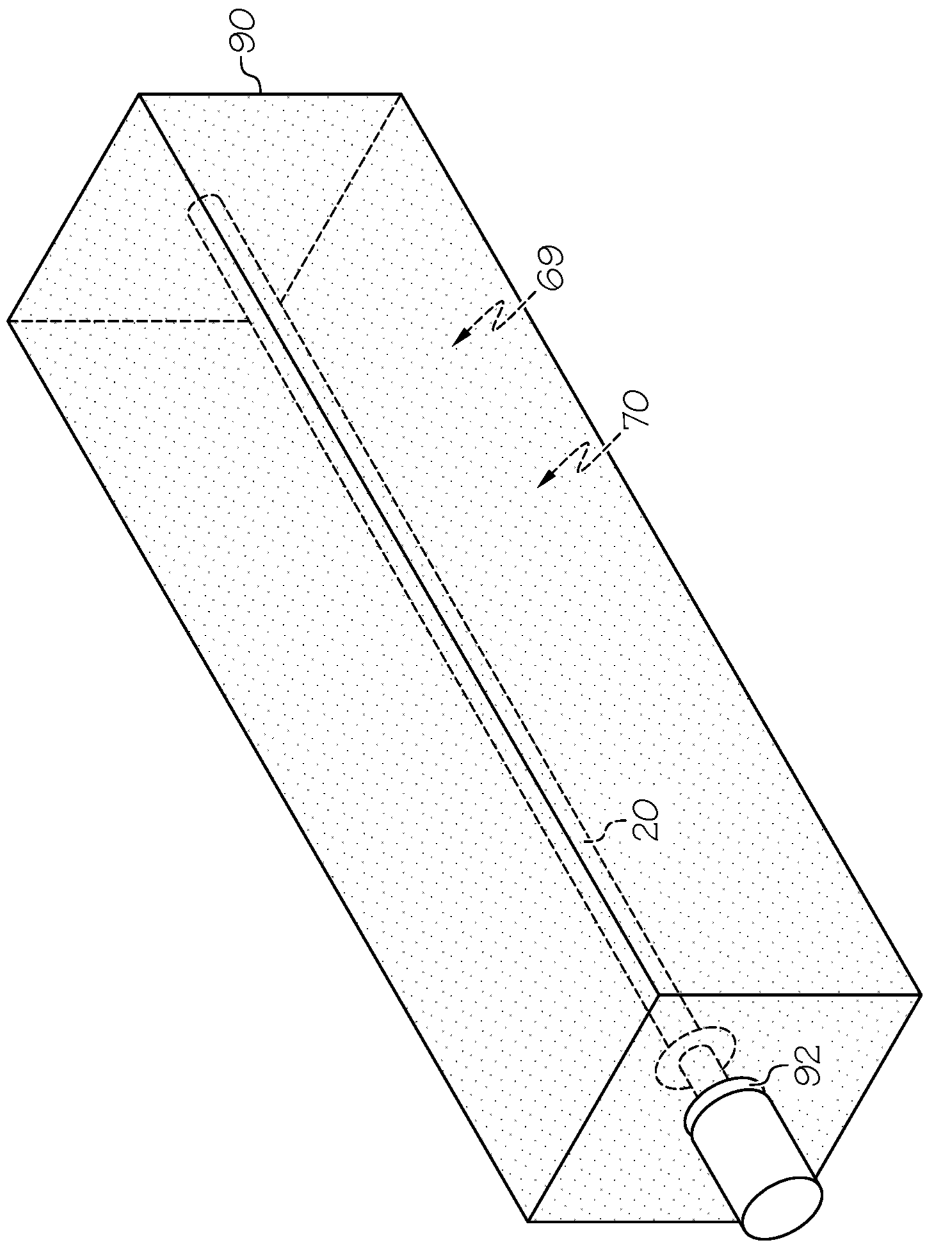
FIG. 8 shows another embodiment of a noise reduction circuit.

FIG. 8 shows another embodiment of a noise reduction circuit 20. In some embodiments, the noise reduction circuit 20 comprises enclosure 90 filled with a particulate material 70, and components of the noise reduction circuit 20 (e.g. wire 30, shielding 40, protector 56, etc.) are submerged in the particulate material 70. In some embodiments, the enclosure 90 comprises a terminal 92 in electrical communication with the conductive attachment location 38 of the wire 30, and the terminal 92 can be electrically attached to a conductor a device or component, such as a ground connection, a neutral or a hotwire. In some embodiments, the particulate material 70 comprises various mixtures of crystals, minerals, shungite powder, tourmaline, sand, metals, etc. In some embodiments, the particulate material 70 comprises crystalline and/or mineral material 69 as discussed herein. In some embodiments, the particulate material 70 is available from Entreq, Ronnetorp 18, 265 90 S-Åstorp, Sweden.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A device comprising:

a first power conductor;

a second power conductor;

a first noise reduction circuit comprising:

a conductive wire comprising a conductive attachment location contacting the first power conductor;

an insulator surrounding the conductive wire, the insulator covering all portions of the conductive wire except the conductive attachment location; and a shielding material oriented around the insulator, the shielding material comprising a conductive sheet comprising a binder lamination and metallized fibers, the metallized fibers arranged in a non-woven pattern;

wherein the conductive wire does not contact any other conductor; and a second noise reduction circuit comprising a second conductive wire, a second insulator surrounding the second conductive wire and a second shielding material oriented around the second insulator, the second shielding material comprising metallized fibers, the second conductive wire in electrical communication with the second power conductor.

2. The device of claim 1, wherein the metallized fibers of the shielding material are arranged in a random pattern.

3. The device of claim 1, further comprising a filter arranged to surround the conductive wire.

4. The device of claim 3, wherein the filter comprises a ring of magnetic material.

5. The device of claim 1, wherein the conductive wire and insulator are arranged in a loop and the conducive attachment location comprises first and second ends of the conductive wire.

6. The device of claim 5, the loop comprising a first elongate portion and a second elongate portion extending adjacent to one another.

7. The device of claim 1, the second conductive wire extending in a loop within the second shielding material.

8. The device of claim 1, comprising an IEC coupler comprising the first power conductor and the second power conductor.

9. The device of claim 1, comprising an electronic device comprising a chassis, wherein the noise reduction circuit is oriented within the chassis.

10. The device of claim 1, comprising a ground conductor and a third noise reduction circuit comprising a third conductive wire, a third insulator surrounding the third conductive wire and a third shielding material oriented around the third insulator, the third shielding material comprising metallized fibers, the third conductive wire in electrical communication with the ground conductor.

11. A device comprising:

a power line arranged to receive a voltage; and a noise reduction circuit comprising:

an insulated wire comprising a conductor, insulation and a conductive attachment location, the conductive attachment location contacting the power line, the insulation covering all portions of the conductor except the conductive attachment location; and a shielding material oriented around the insulated wire, the shielding material comprising metallized fibers arranged in a non-woven pattern;

wherein the insulated wire is arranged in a loop, the conductive attachment location comprises first and second ends of the conductor and the conductor does not provide the voltage.

12. The device of claim 11, wherein the metallized fibers of the shielding material are arranged in a random pattern.

13. The device of claim 11, wherein the shielding material comprises a conductive sheet comprising a binder lamination and said metallized fibers.

14. The device of claim 11, further comprising a filter arranged to surround the insulated wire.

15. The device of claim 14, wherein the filter comprises a ring of magnetic material.

16. The device of claim 11, the loop comprising a first elongate portion and a second elongate portion extending adjacent to one another.

17. A device comprising:

a first power conductor, a second power conductor and a ground conductor;

a first noise reduction circuit comprising a first conductive wire contacting the first power conductor, a first insulator surrounding the first conductive wire and a first shielding material oriented around the insulator, the first shielding material comprising a conductive sheet comprising a binder lamination and metallized fibers, wherein the first conductive wire does not contact any other conductor; and a second noise reduction circuit comprising a second conductive wire, a second insulator surrounding the second conductive wire and a second shielding material oriented around the second insulator, the second shielding material comprising metallized fibers, the second conductive wire in electrical communication with the ground conductor.

18. The device of claim 17, comprising an IEC coupler comprising the first power conductor, the second power conductor and the ground conductor.

19. The device of claim 17, comprising a third noise reduction circuit comprising a third conductive wire, a third insulator surrounding the third conductive wire and a third shielding material oriented around the third insulator, the third shielding material comprising metallized fibers, the third conductive wire in electrical communication with the second power conductor.

* * * * *